United States Patent
Young

(10) Patent No.: US 7,438,828 B2
(45) Date of Patent: Oct. 21, 2008

(54) WATER TREATMENT MIXTURE

(76) Inventor: Wing Yip Young, 70 Blossom Dr., San Rafael, CA (US) 94901

( * ) Notice: Subject to any disclaimer, the term of this patent is extended or adjusted under 35 U.S.C. 154(b) by 42 days.

(21) Appl. No.: 11/458,152

(22) Filed: Jul. 18, 2006

(65) Prior Publication Data

US 2006/0273039 A1     Dec. 7, 2006

Related U.S. Application Data

(63) Continuation-in-part of application No. 10/746,451, filed on Dec. 23, 2003, now abandoned.

(51) Int. Cl.
*C02F 5/10* (2006.01)

(52) U.S. Cl. .................. 252/181; 210/716; 210/728; 252/175

(58) Field of Classification Search ............ 210/716
See application file for complete search history.

(56) References Cited

U.S. PATENT DOCUMENTS

| | | | |
|---|---|---|---|
| 4,104,159 A * | 8/1978 | Kanai | 210/667 |
| 4,177,142 A | 12/1979 | Halbfoster | |
| 4,699,730 A * | 10/1987 | Miles et al. | 252/181 |
| 4,710,298 A * | 12/1987 | Noda et al. | 210/505 |
| 4,927,543 A | 5/1990 | Bablon et al. | |
| 5,369,072 A | 11/1994 | Benjamin et al. | |
| 5,615,862 A * | 4/1997 | Gaudette | 252/175 |
| 5,897,784 A * | 4/1999 | Mills | 210/705 |
| 5,942,115 A | 8/1999 | Rieber | |
| 6,027,642 A | 2/2000 | Prince et al. | |
| 6,132,625 A | 10/2000 | Moffett | |
| 6,312,604 B1 * | 11/2001 | Denkewicz et al. | 210/728 |
| 6,383,370 B1 | 5/2002 | Keever et al. | |
| 6,447,686 B1 | 9/2002 | Choi et al. | |
| 6,454,949 B1 | 9/2002 | Sesay et al. | |
| 6,833,075 B2 | 12/2004 | Hughes | |

FOREIGN PATENT DOCUMENTS

CN    1227192 A *  2/1998
JP    361038611 A *  2/1986

* cited by examiner

*Primary Examiner*—Peter A. Hruskoci
(74) *Attorney, Agent, or Firm*—Martin Fleit; Paul D. Bianco; Fleit Gibbons Gutman Bongini & Bianco PL

(57) ABSTRACT

A product and apparatus for cleaning water or industrial and sewage waste water includes a mixture of diatomite that is heated and stirred to impart an enhanced negative electrical charge to the diatomite. A mixture of approximately 50% aluminium chloride ($AlCl_3$) by volume is blended to provide a powder mixture for use as a flocculant in the system. According to a modification, the charged diatomite is instead blended with a mixture of approximately 50% ferric chloride ($FeCl_3$) by volume and is stored in liquid form for later use as a flocculant in the system. From one to five percent, by volume, of polyacrylamide is preferably added to the mixture for use in sewage waste water treatment applications. An efficient system for reacting either the mixture or separately adding the diatomite and the metallic chloride to the water is described.

10 Claims, 4 Drawing Sheets

WATER TREATMENT MIXTURE

RELATED APPLICATION

This application is a continuation-in-part of application Ser. No. 10/746,451 filed Dec. 23, 2003, now abandoned, the contents of which are herein incorporated by reference in their entirety, and for which benefit is claimed under 35 U.S.C. 120.

BACKGROUND OF THE INVENTION

1. Field of the Invention

The present invention, relates to method and apparatus for water purification, and to combination of water purification and energy generation, and more particularly, to application of such method and apparatus to industrial and municipal waste-water treatment.

2. Prior Art

The treatment of industrial waste water and sewage has posed many difficult problems to overcome. For example, various chemicals that are present in industrial waste water resist removal. Similarly, sewage waste water may also contain a wide array of substances, some of which are also difficult to separate from the water.

Even when presently known methods work, there is room for improvement. For example, the area of land that is required for such treatment is a valuable commodity; it is desirable to reduce this area so that greater utility can be made of the land.

It is also desirable to reduce the investment required in water treatment-building construction and also the cost of operation afterwards.

It is similarly desirable to increase efficiency in purifying industrial waste water and sewage water, thereby providing a higher quality of water for release into the environment as well as lessening the need for treatment chemicals and flocculants.

It is also desirable to be able to adapt to changes in flow rates, for example when sewage flow rates increase or decrease while maintaining high treatment efficiency.

It is further desirable that such operation be temperature insensitive over the normal operating temperature range of the system.

It is desirable that much of the remaining accumulated sludge be of sufficient quality that it can be used as fertilizer or adapted as a fuel, thereby creating a revenue stream.

Also, prior waste water treatment methods and systems tend to be slow, often requiring twelve or more hours to chemically react with certain flocculants or to be affected by biological treatment methods sufficient for discharge. If the time required is great, then a substantially large facility is required to treat a correspondingly large flow rate. If the treatment process is slow, the facility may simply not be able keep up with the flow during peak periods. The risk of then having to, by way of mere necessity, discharge substantially polluted waste water also arises. This poses a bio-hazard for all concerned.

The above needs also apply in general to the purification of water, for whatever purpose and regardless of how the water is to be used, and in particular, water that will subsequently be used as drinking water. Drinking water often begins as river or lake water and is apt to contain a variety of pollutants and organisms that require removal prior to consumption. The instant invention applies to the purification and treatment of drinking water, as well.

Accordingly, there exists today a need for a water treatment mixture and system for use that furthers the attainment of these objectives.

Clearly, such a product and system would be useful and desirable.

Waste water treatment mixtures and systems are, in general, known. The use of diatomite to filter beer, stabilize dynamite, or improve asphalt is known. Diatomite has also been used in China to filter sewage with different mixtures and always with an intermediate filter. While the structural arrangements of the known types of products and systems may, at first appearance, have similarities with the present invention, they differ in material respects. These differences, which will be described in more detail hereinafter, are essential for the effective use of the invention and which admit of the advantages that are not available with the prior products and systems.

SUMMARY OF THE INVENTION

It is an object of the present invention to provide a water treatment mixture and system for use that includes a diatomite and a metallic chloride mixture used as a flocculant, rather than as a filter, as taught by the prior art. It is also an important object of the invention to provide a water treatment mixture and system for use that is faster at purifying water than previously known types of chemical or biological treatment.

Another object of the invention is to provide a water treatment mixture and system for use that includes electrically charged diatomite and a metallic chloride mixture for use as a flocculant.

Still another object of the invention is to provide a water treatment mixture and system for use that includes electrically charged diatomite and a metallic chloride mixture as a flocculant which can be prepared ahead of time and then stored for later use for an extended period of time without a significant loss of electrical charge or efficacy.

Still yet another object of the invention is to provide a water treatment mixture and system for use that does not require the use of filters.

Yet another important object of the invention is to provide a method and apparatus for water treatment that is useful in treating either industrial waste water or sewage. Still yet another important object of the invention is to provide a water treatment system that further advances the goals of reducing the amount of land required by a treatment facility and also the amount of land that is required for the storage of sludge, and which requires a lower initial investment for construction of the treatment facility and which provides for long term economical operation of the treatment facility, and which improves water treatment efficiency, and provides adaptability for responding quickly to changes in the flow rate, and is not affected by reasonable temperature fluctuations, and which helps to reduce subsequent environment contamination.

A first continuing object of the invention is to provide a water treatment mixture and system for use that is effective at extracting germs, bacteria, and organisms from the water.

A second continuing object of the invention is to provide a water treatment mixture and system for use that is effective at attracting, condensing, and settling suspended particles out of city and industrial waste water.

A third continuing object of the invention is to provide a water treatment mixture and system for use that is adapted to permit the waste particles to settle to the bottom of a tank while permitting clear water to accumulate and flow out from the top of the tank.

A fourth continuing object of the invention is to provide a water treatment mixture that can be packaged, stored, and sold for later use as a flocculant.

A fifth continuing object of the invention is to provide a water treatment mixture and system for use that is effective at removing heavy metals as well as inks from industrial waste water and from sewage.

A sixth continuing object of the invention is to provide a water treatment mixture and system for use that is effective at cleansing especially dirty industrial waste water or sewage waste water.

A seventh continuing object of the invention is to provide a water treatment mixture and system for use that is effective at treating industrial waste water or sewage waste water without the need for an intermediate filter (i.e., a screen).

An eighth continuing object of the invention is to provide a water treatment mixture and system for use that utilizes a reaction chamber and one settling tank instead of a plurality of settling ponds.

A ninth continuing object of the invention is to provide a water treatment mixture and system for use that utilizes two or more reaction chambers for each settling tank.

A tenth continuing object of the invention is to provide a water treatment mixture and system for use that can purify incoming waste water sufficient for discharge within approximately two hours of time.

An eleventh continuing object of the invention is to provide a water treatment mixture and system for use that utilizes as many reaction chambers and as many settling tanks as necessary to accommodate the quantity of flow required at any size of water treatment facility.

A twelfth continuing object of the invention is to provide a method of water treatment in combination with energy generation so that the system results in no or a minimum of waste to be disposed.

Briefly, the methods and apparatus of water treatment utilizes a pre-prepared special mixture of diatomite, the latent negative electrical charge of which has been substantially increased, and a metal chloride, especially aluminium chloride. To substantially increase the latent negative electrical charge, the diatomite is heated to from between 170° F. to 225° F., and preferably between 180° F. to 200° F., in an iron container, pot or vessel while stirring with a raw iron paddle. Approximately 50% by volume of the diatomite, with the increased negative electrical charge, is combined with approximately 50% by volume aluminium chloride ($AlCl_3$) (the preferred material) and blended to create a homogeneous mixture in powder form that will retains the increased negative electrical charge for at least one year. The aluminium chloride content can vary from 40% by volume to 60% by volume. To this mixture is added from 1-5%, by volume, of polyacrylamide. This final mixture is used as a flocculant in the method and system of the present invention, as described hereinafter. Although it is possible to blend the increased negative electrically charged diatomite with ferric chloride ($FeCl_3$) in a ratio of 50% by volume to 50% by volume, this blend will preferably be needed to be diluted with water sufficiently so that it can be stored in liquid form for later use as a flocculant. The 1-5%, by volume, of polyacrylamide can be added to this liquid mixture. The addition of the polyacrylamide is especially useful in the treatment of waste water (i.e., sewage).

Still further objects of the invention include a composition for use as a flocculant for removing deleterious substances from water, comprising a mixture of treated diatomite and a metal chloride having a long term sustainable negative electric charge of a magnitude sufficient to produce movement in human hair when brought close to it.

The metal chloride in the composition is selected from the group consisting of ferric chloride, aluminium chloride, and magnesium chloride. Preferably the metal chloride is aluminium chloride. The mixture is composed of equal parts by volume of diatomite and metallic chloride. The mixture can include polyacrylamide. In a preferred embodiment, the mixture is composed of equal parts by volume of diatomite and aluminium chloride, and from 1 to 5% of polyacrylamide.

Further the objects include a method of making a composition for use as a flocculant for removing deleterious substances from water, comprising the steps of a. heating diatomite in an iron vessel from room temperature to a temperature of from 170° F. to 225° F., b. stirring with an iron paddle during heating to substantially enhance diatomite's natural negative charge electrical, c. cooling the heated and stirred diatomite to room temperature, and d. mixing the cooled diatomite with a metal chloride selected from the group consisting of ferric chloride, aluminium chloride, and magnesium chloride, In the method, polyacrylamide can be added to the mixture. The preferred heating is to 180° F. to 200° F. The preferred mixture is of equal parts by volume of the diatomite and the metal chloride. The mixture can include 1 to 5% of polyacrylamide.

Further objects include a method for treating waste water, comprising the steps of:

(a) establishing a vertically oriented first reaction zone having a cross section that increases from a small cross section at the bottom to a maximum at the top;

(b) establishing a vertically oriented secondary reaction zone surrounding the first reaction zone that communicates with the first reaction zone at top and bottom;

(c) establishing a vertically oriented collection zone surrounding the secondary reaction zone that communicates with the secondary reaction zone at the bottom;

(d) treating diatomite to impart a long term sustainable negative electric charge of a magnitude sufficient to produce movement in human hair when brought close to it;

(e) maintaining a source of waste water to be treated;

(f) mixing the treated diatomite and a metal chloride with waste water to be treated, (g) drawing waste water from the source and injecting the waste water with treated diatomite and a metal chloride mixed therein into the bottom of the first reaction zone under sufficient pressure so that it will flow upwardly and overflows the top of the first reaction zone with at least the lower portion of the first reaction zone being in a turbulent state, the overflow flowing downwardly through the secondary reaction zone;

(h) recirculating a first portion of the down flow through the secondary reaction zone to the bottom of the first reaction zone to be mixed with the waste water being injected into the bottom of the first reaction zone;

(i) recirculating a second portion of the down flow through the secondary reaction zone to mix with the waste water from the source;

(j); circulating a third portion of the down flow through the secondary reaction zone to the collection zone surrounding the secondary reaction zone whereupon the solids settle and separate from the water to form a first solids layer at the bottom of the collection zone and water forms a second clarified layer at the top of the collection zone; and (k) removing clarified water from the top of the collection zone and solids from the bottom of the collection zone.

The preferred metal chloride is aluminium chloride. Also, a plurality of first reaction zones can be employed. The waste water can be subjected to a preliminary treatment to remove heavy solids, large solids and oxygenated. A germicide/bactericide can be added to the waste water before injection into the first reaction zone. The method can include the steps of settling removed solids, adding a water separation material to the settled solids, removing water from the solids, and returning removed water to the source of waste water to be treated. If the method is for treating sewage containing waste water the method can include the steps of mixing the solids having water removed therefrom with a combustible material, burning the mixed solids and combustible material to generate hot gases, using the hot gases to generate electricity, collecting the ash containing diatomite from the burned mixture, using the collected ash as a soil improvement material. Further, the method can include the further steps of removing diatomite from the ash, and reusing the diatomite. The pH of the waste water is preferably neutralized prior to being injected into the first reaction zone.

The objects further include apparatus for treating waste water, comprising:

a. means for establishing a vertically oriented first reaction zone having a cross section that increases from a small cross section at the bottom to a maximum at the top for reacting waste water;

b. means for establishing a vertically oriented secondary reaction zone surrounding the first reaction zone that communicates with the first reaction zone at top and bottom for continuing reacting waste water;

c. means for establishing a vertically oriented collection zone surrounding the secondary reaction zone that communicates with the secondary reaction zone at the bottom for collecting solids and clarified water;

d. means for treating diatomite to impart a long term sustainable negative electric charge of a magnitude sufficient to produce movement in human hair when brought close to it;

e. means for maintaining a source of waste water to be treated;

f. means for mixing the treated diatomite and a metal chloride with waste water to be treated for reacting;

g. means for drawing waste water from the source and injecting the waste water with treated diatomite and a metal chloride mixed therein into the bottom of the first reaction zone under sufficient pressure so that it will flow upwardly and overflows the top of the first reaction zone with at least the lower portion of the first reaction zone being in a turbulent state, the overflow flowing downwardly through the secondary reaction zone;

h. means for recirculating a first portion of the down flow through the secondary reaction zone to the bottom of the first reaction zone to be mixed with the waste water being injected into the bottom of the first reaction zone;

i. means for recirculating a second portion of the down flow through the secondary reaction zone to mix with the waste water from the source;

j. means for circulating a third portion of the down flow through the secondary reaction zone to the collection zone surrounding the secondary reaction zone whereupon the solids settle and separate from the water to form a first solids layer at the bottom of the collection zone and water forms a second clarified layer at the top of the collection zone; and k. means for removing clarified water from the top of the collection zone and solids from the bottom of the collection zone.

The apparatus for treating waste water according to the above uses aluminium chloride as the metal chloride. A plurality of first reaction zones can be used. The apparatus can include means for subjecting the waste to a preliminary treatment to remove heavy solids, large solids and to oxygenate. The apparatus can include means to add a germicide/bactericide to the waste water before injection into the first reaction zone to remove germs and bacteria.

The apparatus can include means for settling removed solids, adding a water separation material to the settled solids, removing water from the solids to obtain substantially water-free solids, and means for returning removed water to the source of waste water to be treated to recirculated same. The apparatus can include means for mixing the solids having water removed therefrom with a combustible material, means for burning the mixed solids and combustible material to generate hot gases, means for using the hot gases to generate electricity, means for collecting the ash containing diatomite from the burned mixture, and means for using the collected ash as a soil improvement material to improve soil. The apparatus can include means for removing diatomite from the ash for reusing the diatomite.

The apparatus can include means for neutralizing the pH of the waste water prior to being injected into the first reaction zone.

DETAILED DESCRIPTION OF PREFERRED EMBODIMENTS OF THE INVENTION

Figure 1:
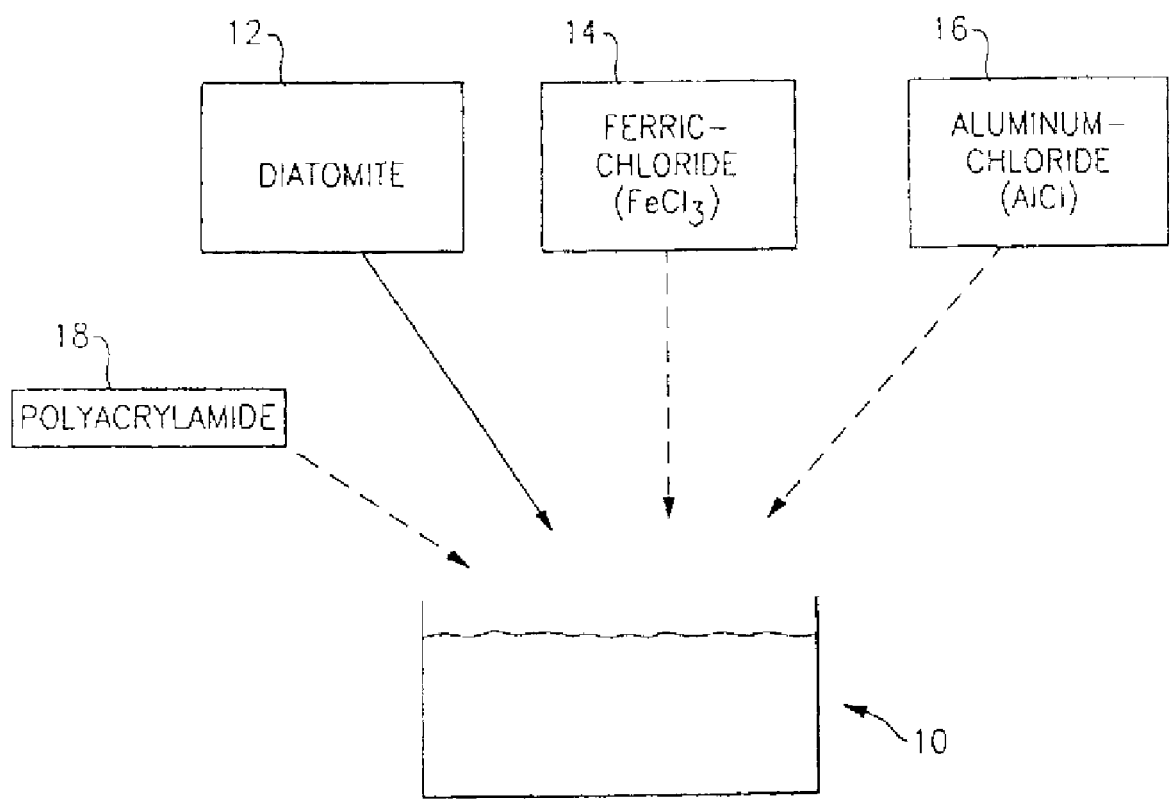
FIG. 1 is a block diagrammatic view showing the blending of ingredients, according to the present invention, to make the novel waste water treatment mixture.

Referring to all of the figures and in particular now to FIG. 1 is shown, the method of making of the novel water treatment mixture according to the present invention. Diatomite naturally carries a very weak negative electrical charge, so weak that if brought close to human hair, the hair will not move. As shown in FIG. 1 diatomite from source 12 is added to or loaded into an iron (raw iron) vessel, pot or vat 10 at room temperature, and stirred with an iron (raw iron) paddle or stirrer manually or by machine while being heated to preferably from 180° F. to 200° F. at which point the negative electrical charge will have been substantially enhanced or increased. This will be evidenced and determined by testing by bringing the diatomite close to human hair and note the movement of the hair. When substantial movement of the hair is noted, the negative electrical charge on the diatomite has been increased substantially. The heating of the diatomite to the noted temperature will take from about 30 minutes to about 2 hours, depending upon the amount of diatomite, the heat applied and the size of the iron pot before the temperature will reach the 180° F. to 200° F. point. When the temperature of the diatomite, while being stirred reaches from about 170° F. to about 225° F., and preferably 180° F. to 200° F., the desired enhancement of the negative electrical charge will have been achieved. Heating above 225° F. will not give any substantial improvement and will only waste energy. Heating and stirring the diatomite in metal vessels other than iron, do not give good results. Thereafter, in the preferred embodiment, after the diatomite has cooled to room temperature, aluminium chloride is added to the vessel 10 from source 16 so that the mixture comprises 50% by volume of diatomite and 50% of aluminium chloride, and the mixture is stirred. Then, 1 to 5% by volume of polyacrylamide from source 18 is added and the final mixture, in powder form is stirred until homogeneous. At this point the mixture can be bagged and stored for later use. Shelf life of the mixture is about one year or longer.

As an alternative, but less effective mixture, ferric chloride from source 14 can be substituted for the aluminium chloride. The final resulting mixture is in liquid form, as opposed to powder form and needs to be packaged accordingly.

A mixture of approximately 50% diatomite by volume that is preferably finely ground or which includes small particles of the diatomite and approximately an equal volume of aluminium chloride gives the best results. The water treatment mixture is blended to form a homogenous mixture.

Magnesium chloride may also be used in certain specialized applications, either alone or in combination with aluminium chloride. The 1 to 5 percent polyacrylamide, by volume, present in the mixture, especially when used in the treatment for municipal waste water helps to accelerate the removal of impurities from the incoming water, and helps in removing water from the sludge, as will be explained hereinafter.

As noted, the diatomite is heated, in an iron (raw iron) vessel, to a temperature of from 180° F. to 200° F. The diatomite from source 12 is stirred in the iron vessel (i.e., a pan) using an iron (raw iron) paddle. The heat and stirring combine to enhance the weak naturally occurring negative electrical charge that characterizes natural diatomaceous earth, and give the diatomite a durable and substantially enhance negative electrical charge, as explained previously. When the diatomite is later cooled and used to form the water treatment mixture, the diatomite retains its enhanced negative electrical charge.

If the water treatment mixture is formed by blending aluminium chloride with the diatomite and polyacrylamide, the resultant water treatment mixture is a powder that can be stored for one year for later use as a flocculant with little or no loss of efficacy.

Tests have shown it to remain stable and effective for use for periods up to about one year.

A sufficient portion of the enhanced negative electrical charge is retained for this period of time. No other known prior used diatomite has the characteristics of the diatomite treated according to the present invention to have an enhanced negative electrical charge with the durability mentioned above.

If the water treatment mixture is formed by blending ferric chloride with the diatomite and polyacrylamide, the resultant water treatment mixture forms a liquid solution that can be stored for an extended period of time for later use as a flocculent. The mixture absorbs ambient moisture (i.e., is hydroscopic) and will eventually become liquid if not shielded from ambient air. An additional quantity of water can be added to attain a desired solution (i.e., liquid). A sufficient portion of the enhanced negative electrical charge is retained by the mixture in this aqueous solution form for a reasonable period of time.

However, over the course of time, the diatomite tends to settle to the bottom of the solution containing the ferric chloride. Therefore, the solution can either be used soon after it is initially blended or it can later be re-stirred without detriment prior to use.

The benefits provided by the mixture of diatomite with the metallic chlorides result when blended and reacted, as is described later, with the incoming water or waste water. It is also possible, after having had benefit of this disclosure, to add the diatomite and the metallic chloride separately to the water that is to be treated, as opposed to pre-mixing them and then letting them mix in the treated water. It is preferred, however, to premix them.

Accordingly, the instant disclosure describes in detail the preferred products and method for use. However, it is anticipated that a substantial benefit will still be realized providing both the diatomite and the metallic chloride are added to the water that is being treated at some point within the overall time that is allotted for the duration of treatment of the water or waste water. It matters little which is added first providing both are added (i.e., used) during the treatment process and prior to injection of the treated water into the reaction chamber or zone.

The use of the water treatment mixture as part of the system herein disclosed is described in greater detail hereinafter, in particular where it is used and how it is reacted with the incoming water or waste water. At this time some of the general benefits that are provided by the water treatment mixture are discussed.

The charged diatomite particles attract and retain small particles, even germs and bacteria, for example, even *e coli* and other organisms and micro-organisms are removed. The aluminium chloride (preferred material), ferric chloride, or other metallic chloride also assumes a small negative electrical charge from the diatomite and is useful in attracting and retaining larger particulates.

The combination is effective at removing a very broad spectrum of pollutants, germs, bacteria, organisms, and various particulates from either industrial waste water or sewage water. The polyacrylamide provides enhanced benefits useful in removing the broad spectrum of pollutants by helping the pollutants adhere better to either the diatomite or to the metallic chloride.

Once the water treatment mixture has been reacted (i.e., allowed to commingle with the waste water for a sufficient period of time) the diatomite and the aluminium chloride or the ferric chloride become heavy and tend to settle out and precipitate to the bottom as soon as the flow rates decrease. This forms a sludge that can later be flushed out for use in a landfill or for use as fertilizer or for energy generation.

The cleaned and purified treated water accumulates at the top above the sludge and is directed away from the treatment facility for discharge into a body of water, for example, a lake or river or ocean, or it is recycled for possible further filtering and reuse, for example for crop irrigation or for human consumption as drinking water.

The water treatment mixture has been shown effective at removing heavy metals, inks, and other substances from the waste water. If the waste water includes either a low or a high pH, it is desirable to neutralize the pH using materials known for this purpose, such as, lime if the pH is acidic and using acids, such as muriatic acid, if the pH is basic, prior to reacting the waste water with the water treatment mixture. One reason for first neutralizing the pH is that whatever substance is used to neutralize the pH and whatever substance may remain thereafter, can in all likelihood also be removed from the waste water (or other source of water) by the water treatment mixture, thereby resulting in optimum treatment of the water.

At times, the waste water may contain a toxic substance or other substance that requires an additional or special treatment of some kind. This can occur if the waste water is derived from industrial waste water that typically or on occasion is toxic.

Specialized treatment is sometimes required for sewage waste water; if for example, an inappropriate dumping in a drain results in toxic substances. Special treatment may also be required if the resultant water can possibly be used as a source of irrigation or drinking water.

In all of these instances it is desirable to perform the additional or special treatment adding whatever material(s) is/are necessary to the waste water to treat toxic or other substances that may be present before reacting the waste water with the mixture. This again is so that whatever substance(s) may remain after the additional or special treatment has occurred, they can in all likelihood also be removed from the waste water by reacting the treated water with the mixture.

Similarly, if desired, any bactericide, germicide, or other substances intended to kill or weaken any organisms (bacteria, germs, viruses, micro-organisms, etc.) can also in all likelihood be removed along with dead or weakened organism by the water treatment mixture, thereby resulting in optimum treatment of the water. Therefore, these agents (i.e., the bactericide, germicide, etc.) are preferably added to the water prior to reacting the water with the mixture.

If the waste (or other source of) water were to include oils that are lighter than water, it is possible for the water treatment mixture, after it has been reacted with the waste water, to float to the top rather than precipitate to the bottom of the tank. This is more common with industrial waste waters that include oil based paints and other types of oil based wastes than with sewage systems or drinking water purification systems. If this happens, it is then necessary to sweep the top of the tank to gather and remove the reacted water treatment mixture from the cleaned water which would now be disposed underneath the skim at the top.

It is also possible to vary the proportions of diatomite and the metallic chloride depending upon what pollutants and contaminants are in the waste water. A nearly fifty-fifty mixture by volume is preferred for the ratio of the diatomite to the metallic chloride to start, with the polyacrylamide not generally exceeding five percent of the overall total volume. This proportion is varied depending upon the specific needs of the treatment facility. Testing and variation will provide optimum results.

Figure 2:
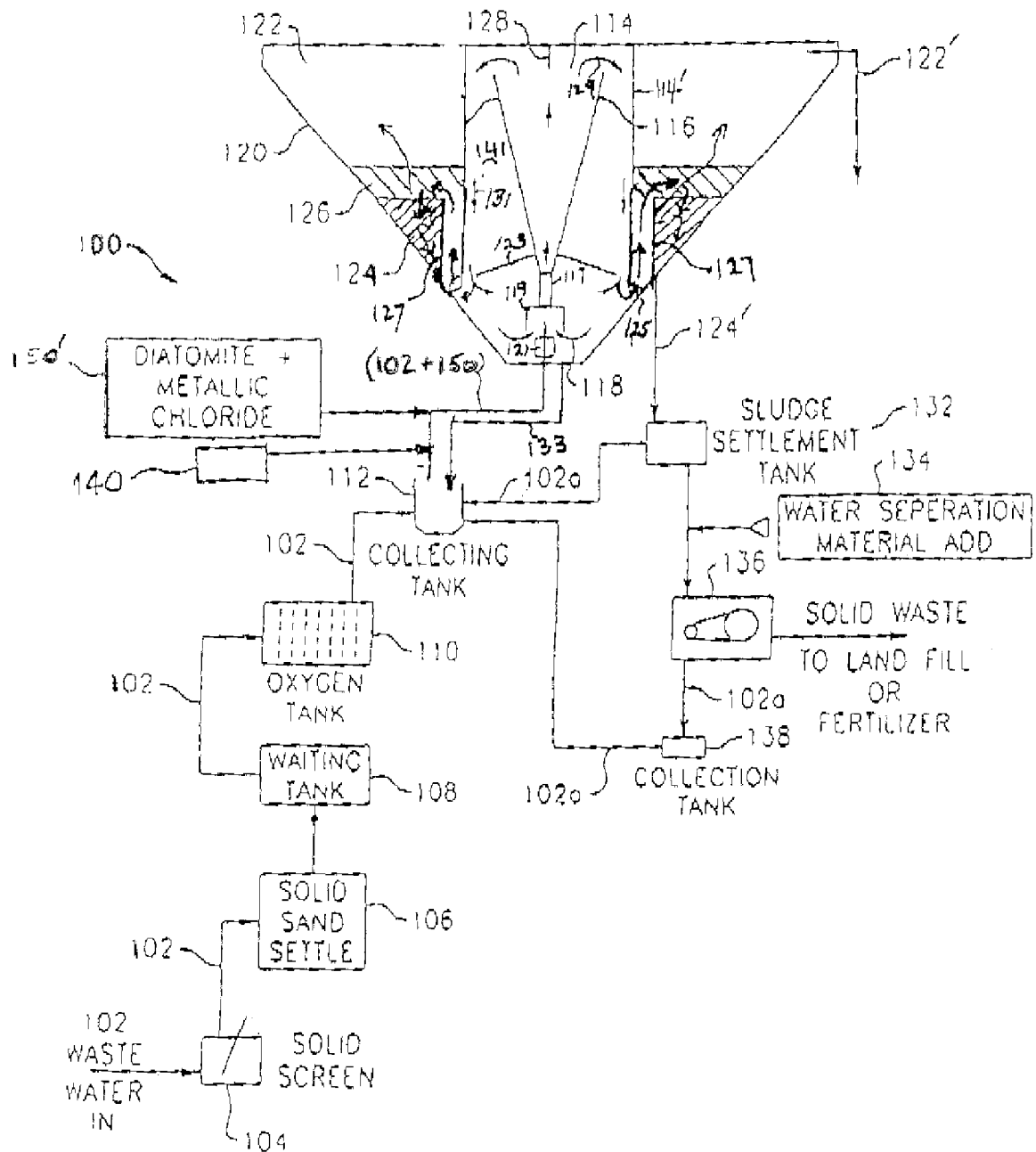
FIG. 2 is a block diagrammatic view of the preferred embodiment of the present invention showing the apparatus and illustrative of the method of the present invention for the treatment of waste water utilizing the novel mixture made according to the illustration of FIG. 1.

Referring now to FIG. 2, there is shown a waste water treatment system, identified in general by the reference numeral 100 that is designed to optimally function with the water treatment mixture obtained from the method of mixing described in conjunction with FIG. 1.

Entering untreated water, herein referred to as "waste water 102" passes through a solid screen station 104 and then to a solid sand settling tank 106 to remove the remaining solids from the waste water 102. From there the waste water 102 goes to a waiting tank or reservoir 108 and then to an oxygen tank 110 where oxygen (or ambient air) is added to the waste water 102. From tank 110 the waste water 102 is directed to a collecting tank 112. From here, prior to the waste water 102 being pumped into a reaction chamber 114, the water treatment mixture 150 from source 150' is added in a proportioned mixture and quantity suitable to the degree of pollution in the waste water 102, as was described hereinabove. This can be done simply by inserting mixture 150 into the line leading from the collecting tank 112, or by inserting a small mixing tank in the line.

The water treatment mixture 150 and waste water 102 via a pump (not shown) are pumped, mixed and injected into the reaction chamber 114. The reaction chamber 114 is defined by a cylindrical wall 114' within an inverted conical settling tank 120. Within the reaction chamber 114 is an inverted conical funnel 116. The lower end of funnel 116 is coupled to a short pipe 117 that is connected at its lower end to an inverted cup 119 having an open bottom mouth. A nozzle 121 is positioned at the entrance to the inverted cup 119 at it mouth; nozzle 121 being fed by the line carrying the waste water 102 and mixture 150 leading from the collecting tank 112 and pump. A circular inclined baffle 123 of umbrella shape extends from the lower end of the funnel 116 directed downwardly toward the lower end of cylindrical wall 114', but terminates short of wall 114' so that an annular space 125 is left open.

The waste water 102 and the water treatment mixture 150 is pumped and injected into the bottom of reaction chamber 114 inside of the V shaped funnel 116 proximate its lower smaller end. The waste water 102 and the water treatment mixture 150 is circulated up through the V shaped funnel 116 with turbulence so that the water treatment mixture 150 reacts with the waste water 102, attracting (in part, by the enhanced negative electrical charges) and adhering the pollutants and solid particles in the waste water 102 to the water treatment mixture acting as a flocculant, as has been previously described.

Due to the shape of the funnel 116, the velocity of the up flowing stream slows appreciably as it nears the top, whereupon it overflow the top of the V shaped funnel 116 and flows downwardly toward the bottom of the V shaped funnel 116 in the annular space 141 between the funnel 116 and the cylindrical wall 114' while continuing to react, see arrows 129. A small opening formed by pipe 117 and cup 119 at the inlet to the V shaped funnel 116 allows a portion of the re-circulating and partially reacted mixture to be drawn or sucked, via nozzle 121, into the entering stream of the waste water 102 and the water treatment mixture 150 that is being forced into the reaction chamber 114 by nozzle 121, see arrows 118. Meanwhile, the descending flow, see arrow 131, at the bottom of the cylindrical wall 114', turns outwardly and reverses direction to go upwardly again after passing through the annular space 125 defined between the bottom of wall 114' and the inclined wall of tank 120. A cylindrical baffle 127 surrounds the cylindrical wall 114' and is spaced from it to define an annular space. As this portion of the flow goes upwardly, through the annular space defined by baffle 127, the solids and other material in the stream, that have been captured by the flocculent, start to settle into sludge while the clarified water 122 continues to rise upwardly in tank 120, ultimately overflowing the top edge of tank 120 via line 122'. The sludge layer 124 builds up in tank 120 surrounding the baffle 127, and from time to time is removed via line 124'. A layer 126 forms between the clarified water 122 and the sludge 124, and is composed of a mixture of sludge and water, in process of separating. The bottom of layer 126 is essentially located at the top of the baffle 127. The system 100 is designed so that at least one-half of the incoming waste water 102 is re-circulated in the reaction chamber 114 using line 133 leading from the bottom of tank 120 to collecting tank 112. Again, depending upon the specific needs, the amount of re-circulation can be extended or controlled as desired. For this purpose, suitable valves are inserted into all lines for control purposes, as is standard in the art.

Ideally, the time for reacting the water treatment mixture 150 with the waste water 102 in the reaction chamber 114, and the time spent in the settling tank 120 until the clear water 122 is of sufficient quality for discharge, is not over two hours time. This is considerably faster than any currently known method. Due to the process of the system, the clear water 122 has a BOD of less than 10 and suspended solids of less than 10. However, this time is a variable that is affected by the design parameters of the system 100, the incoming flow rate of the waste water 102, and the quantity and ratio (i.e., proportions) of the mixture 150 that are applied to the waste water 102. If space is not a problem, it may be more economical in certain instances to increase the size of the settling tank 120 (or tanks) while using a more diluted form of the mixture 150 and allowing considerably more than two hours for treatment to occur.

If the incoming flow rate of the waste water 102 were to increase, then more settling tanks 120 could be utilized or possibly more of the mixture 150 could be used to accelerate the process, as desired. Therefore, it is to be understood that even though faster treatment times are one benefit provided by the mixture 150 and system 100, a longer treatment time is still possible with many of the benefits herein described being attained at low cost. Whatever substance may remain thereafter, can in all likelihood also be removed from the waste water (or other source of water) by the water treatment mixture 150, thereby resulting in optimum treatment of the water. Accordingly, the mixture 150 and system 100 are scaled up or down in size to accommodate any water treatment or purification need.

A baffle plate 128 is disposed adjacent to the reaction chamber 114. The baffle plate 128 is higher than the V shaped funnel 116 and is also higher than the water line at the top of funnel 116. Therefore, the baffle plate 128 directs the water-mixture overflowing the top edge of the funnel 116 to flow more uniformly down the annular space surrounding the funnel 116.

It is noted that the system 100 and mixture 150 are effective at removing solids from the water 102, but not gases that may be in suspension in the water 102, for example, ammonia, nitrogen, or other odorous gases. Ambient air is forced into the bottom of the oxygen tank 110. Ambient air bubbles form and then rise. As they rise, they capture the bulk of gases that are in suspension taking them to the surface and out of the water.

The location of the oxygen tank 110 can be varied in the system 100 as desired. For example, instead of it being before the collecting tank 112, it could be located later so that it receives the purified treated water 122 that is being discharged from the settlement tank 120 for subsequent removal of the gases from the treated water 122.

The mixture 150 and the waste water 102 that is being pumped from the collecting tank 112 into the base of the reaction chamber 114 creates a Venturi that helps to draw in all of the waste water 102 that is down flowing in the annular space 141 between the cylindrical wall 114' and the funnel 116. This ensures that typically, more than one-half and minimally, at least one-half of the waste water 102 entering into the reaction chamber 114 will be forced around (recirculated) to again re-enter the reaction chamber 114. This recirculation improves the efficiency of the system 100.

The sludge 124' is pumped or directed into a sludge settlement tank 132. A water separation material 134, such as polyacrylamide, may be added to assist in the separation process and the resultant combination of the sludge 124 and the separation material 134 is directed to a known state-of-the-art water separation machine 136.

The water separation machine 136 is used to separate additional waste water 102a from the solid waste material in the sludge 124. The water separation machine 136 uses centrifugal force or pressure to typically effect the separation. The solid waste material portion of the sludge 124 is discharged from the water separation machine 136 into a truck (typical) and is taken either to a land fill or to a processing facility for possible additional treatment, packaging, and eventual sale for use as fertilizer.

The additional waste water 102a that is extracted from the sludge 124 by the water separation machine 136 is directed to a collection tank 138. From the collection tank 138, the additional waste water 102a is sent again to the collecting tank 112 for additional reacting.

Similar additional waste water 102a is obtained from the sludge settlement tank 132 and is also directed back to the collecting tank 112 for additional reacting.

It is further noted that if a bactericide/germicide 140 is to be used to kill or weaken any organisms such as bacteria, germs, viruses, micro-organisms, etc., the bactericide and/or germicide 140 is preferably added before the mixture 150 is added to the waste water 102 so that when the mixture 150 (i.e., the flocculant) is reacted with the waste water 102, the remaining bactericide/germicide 140 and the remaining dead or weakened bacteria, germs, and viruses can be removed as well from the water 102.

The same timing applies, as was previously described, to neutralizing the pH, or for any other treatment (i.e., for substances or toxins) that is to be accomplished.

It is also noted that, as described hereinabove, it is possible to separately add the diatomite and the metallic chloride, either one being added first to the waste water 102, and also to separately add the polyacrylamide, providing that the diatomite and the desired metallic chloride are both added before injection into the reaction chamber 114.

Figure 3:
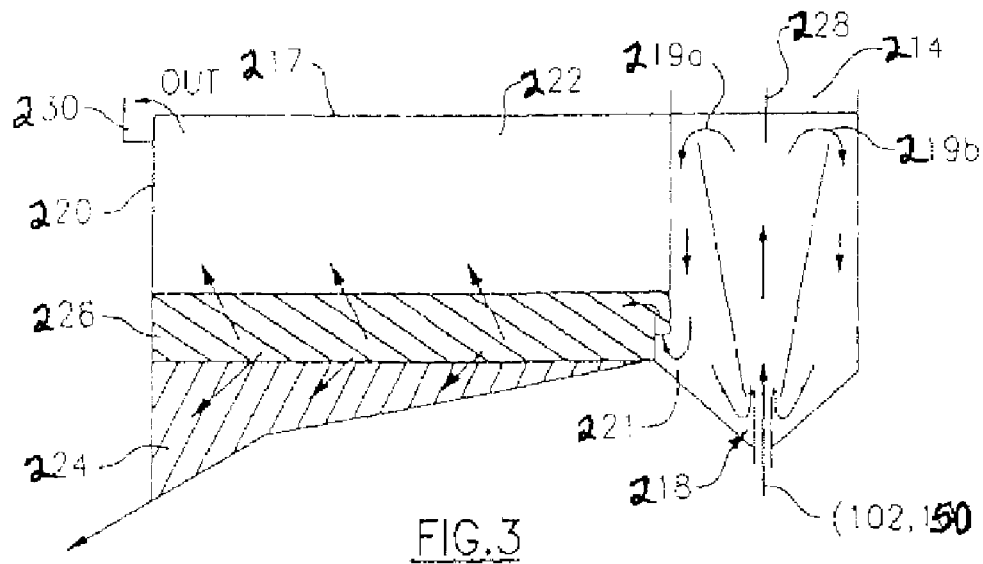
FIG. 3 is a partial side sectional view of the reaction chamber illustrated in FIG. 2 showing a modification.
Figure 4:
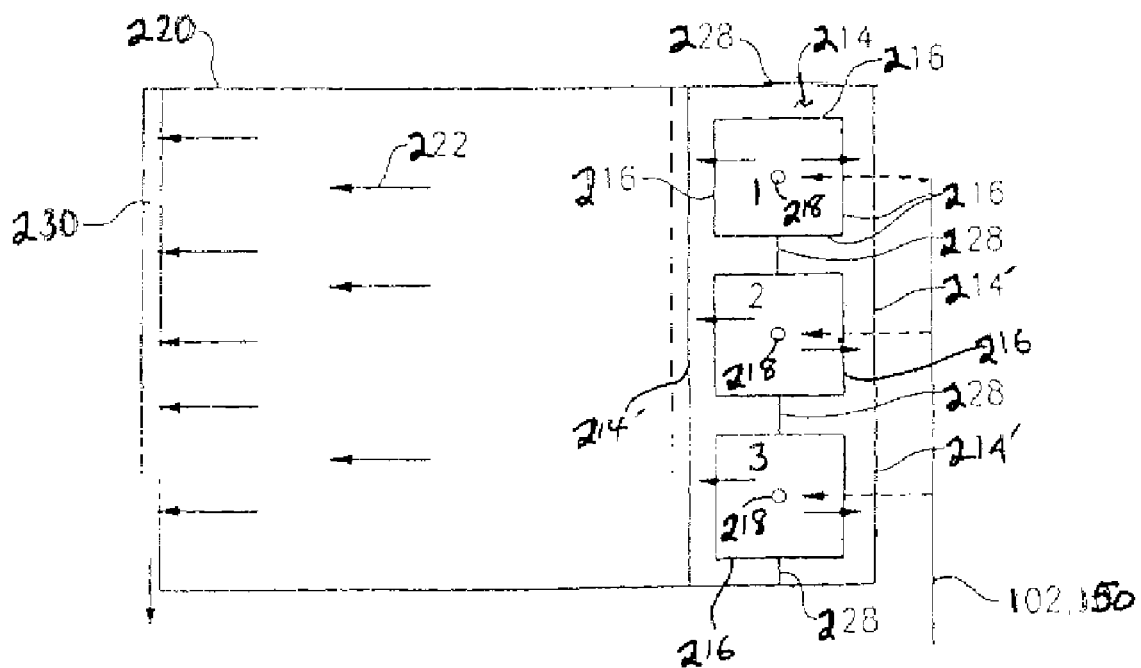
FIG. 4 is a top view of the reaction chamber illustrated in FIG. 2.

Referring now to FIGS. 3 and 4, a further embodiment is show in which several reaction chambers are included in a single tank. As shown, are three serial arranged inverted pyramids defined by slanted walls form V-shaped funnels 216 labelled 1, 2 and 3 that converge at the bottom to openings 218 and have wider open tops terminating slightly below the top of tank 220 in which they are mounted.

The waste water 102 and the water treatment mixture 150 is pumped into the bottom of each reaction chamber 214 inside of the associated V shaped funnel 216 proximate the convergence point. This forces the waste water 102 and the water treatment mixture 150 up through the V shaped funnel 216 where the water treatment mixture 150 reacts with the waste water 102, attracting (in part, by the negative charge) and adhering the pollutants thereto, as has been previously described. The overflow of the funnel goes down the space between the walls 214' and the funnel 216, as previously explained, and recirculated. Some of the down flow passes into the tank 220 and creates sludge layer 224 and clarified water layer 222 with a mixed layer 226 between them.

This process is repeated for as long as necessary or desired until the diatomite and metallic chloride have sufficiently reacted with the waste water 102, become heavier and settle out the bottom through an opening into settling tank 220. Clear purified treated water 222 rises to the top for discharge while sludge 224 forms at the bottom of the settling tank 220.

A layer of a mixture of sludge and water 226 forms in-between the sludge 224 and the treated water 222.

The system is designed so that at least one-half of the incoming waste water 102 is re-circulated in the reaction chambers 214. Again, depending upon the specific needs, the amount of re-circulation can be extended as desired.

Ideally, the time for reacting the water treatment mixture 150 with the waste water 102 in the reaction chamber 214 and the time spent in the settling tank 220 until the clear water 222 is of sufficient quality for discharge is not over two hours time. This is considerably faster than any currently known method.

However, this time is a variable that is affected by the design parameters of the system, the incoming flow rate of the waste water 102, and the quantity and ratio (i.e., proportions) of the mixture 150 that are applied to the waste water 102. If space is not a problem, it may be more economical in certain instances to increase the size of the settling tank 220 (or tanks) while using a more diluted form of the mixture 150 and allowing considerably more than two hours for treatment to occur.

If the incoming flow rate of the waste water 102 were to increase, then more of the reaction chambers 214 and possibly more settling tanks 220 could be utilized or possibly more of the mixture 150 could be used to accelerate the process, as desired.

Therefore, it is to be understood that even though faster treatment times are one benefit provided by the mixture 150 and system, a longer treatment time is still possible with many of the benefits herein described being attained at low cost, whatever substance may remain thereafter, can in all likelihood also be removed from the waste water (or other source of water) by the water treatment mixture 150, thereby resulting in optimum treatment of the water.

A baffle plate 228 is disposed adjacent to each reaction chamber 214. The baffle plates 128 (sees FIGS. 3 & 4) are higher than the V shaped funnels 216 and they are also higher than a water line (217, FIG. 3). Therefore, the baffle plates 228 direct the waste water 102 that enters into each of the reaction chambers 214 into one of two exit paths, a first path 219a and a second path 219b (FIG. 3). The purpose of this is described in greater detail hereinafter.

The system shown and described in conjunction with the illustrations of FIGS. 3 and 4 include all the components described with respect to FIG. 2. Therefore, it is noted that the system and mixture 150 are effective at removing solids from the water 102, but not gases that may be in suspension in the water 102, for example, ammonia, nitrogen, or other odorous gases. Ambient air is forced into the bottom of the oxygen tank 110.

Ambient air bubbles form and then rise. As they rise, they capture the bulk of gases that are in suspension taking them to the surface and out of the water.

The location of the oxygen tank 110 can be varied in the system as desired. For example, instead of it being before the collecting tank 112, it could be located later so that it receives the purified treated water 222 that is being discharged from the settlement tank 220 for subsequent removal of the gases from the treated water 222.

It is also noted that, as described hereinabove, it is possible to separately add the diatomite and the metallic chloride, either one being added first to the waste water 102, and also to separately add the polyacrylamide, providing that the diatomite and the desired metallic chloride are both added before injecting the waste water into tank 220.

Referring again in particular to FIG. 4, which shows a top view of the reaction chamber 214 and settling tank 220 of FIG. 3, three of the reaction chambers 214 defined by walls 214' are shown. As incoming volume of the waste water 202 varies, valves (not shown) are opened or closed to direct the incoming waste water 202 that is combined with the water treatment mixture 150 into as many of the reaction chambers 214 as are needed to handle the flow rate. Three reaction chambers 214 per settling tank 220 are generally preferred, however, any number of the reaction chambers 214 can be used with one or more (i.e., any number) of the settling tanks 220 to accommodate any volume of flow for the incoming waste water 102. Accordingly, the mixture 150 and system are scaled up or down in size to accommodate any water treatment or purification need.

The sludge 224 is periodically pumped out for depositing at a land fill or for use as fertilizer. The sludge 224 has retail value and can be sold as fertilizer. The mixture 226 continues to separate forming more sludge 224 that settles to the bottom of the tank 220 and more purified water 222 that rises upward.

It is also noted that the flocculation process continues as long as any of the mixture 150 remains in the settling tank 220. Even the sludge 224 at the bottom of the tank 220 continues to attract, by way of its electrical charge, ever more substances until the water 222 is finally discharged out of the tank 220 and system. A channel 230 is provided to direct the clear water 222 out of the settling tank 220 for either direct discharge into a lake, stream, body or water, ocean, or for a possible second treatment, for example, for additional purification for use as a drinking water, or for current reuse as irrigation water, etc., as desired.

The baffle plates 228 are used to direct the waste water 102 rising out of the reaction chambers 214 into either the first path 219a or the second path 219b, as mentioned hereinbefore. The first path 219a circulates to the left (as shown in FIG. 3) where the waste water 102 is directed generally downward toward the small opening 218 at the inlet to the V shaped funnel 216, Some of the waste water 102 enters into the small opening 218 where it once again flows into the reaction chamber 214 for additional agitation and reacting with the mixture 150. However, a portion of the waste water 102 that travels along the first path 219a is directed away from the small opening 218 and toward the settling tank 220 where it enters the settling tank 220 by passing through a tank inlet 221.

The portion of the waste water 102 entering the settling tank 220 then mingles with the mixture of sludge and water 226 where the reaction with the mixture 150 continues over time, forming additional particulates that precipitate to form more sludge 224 on the bottom while leaving behind more treated water 222 that rises to the top.

Accordingly, it is important to pump out the accumulating sludge 224 so that its level does not rise up to that of the tank inlet 221. This would make it more difficult for any waste water 102 to enter into the settling tank 220.

The waste water 102 that flows out of the reaction chamber 214 along the second path 219b (to the right as shown in FIG. 3) has no choice other than to flow downward to the small opening 218 where it once again all flows into the reaction chamber 214 for additional agitation and reacting with the mixture 150. Since about one-half of all of the waste water 102 that leaves the reaction chamber 214 travels along the second path 219b, this particular half of the waste water 102 is forced to re-enter the reaction chamber 214 for additional reacting with the mixture 150.

Figure 5:
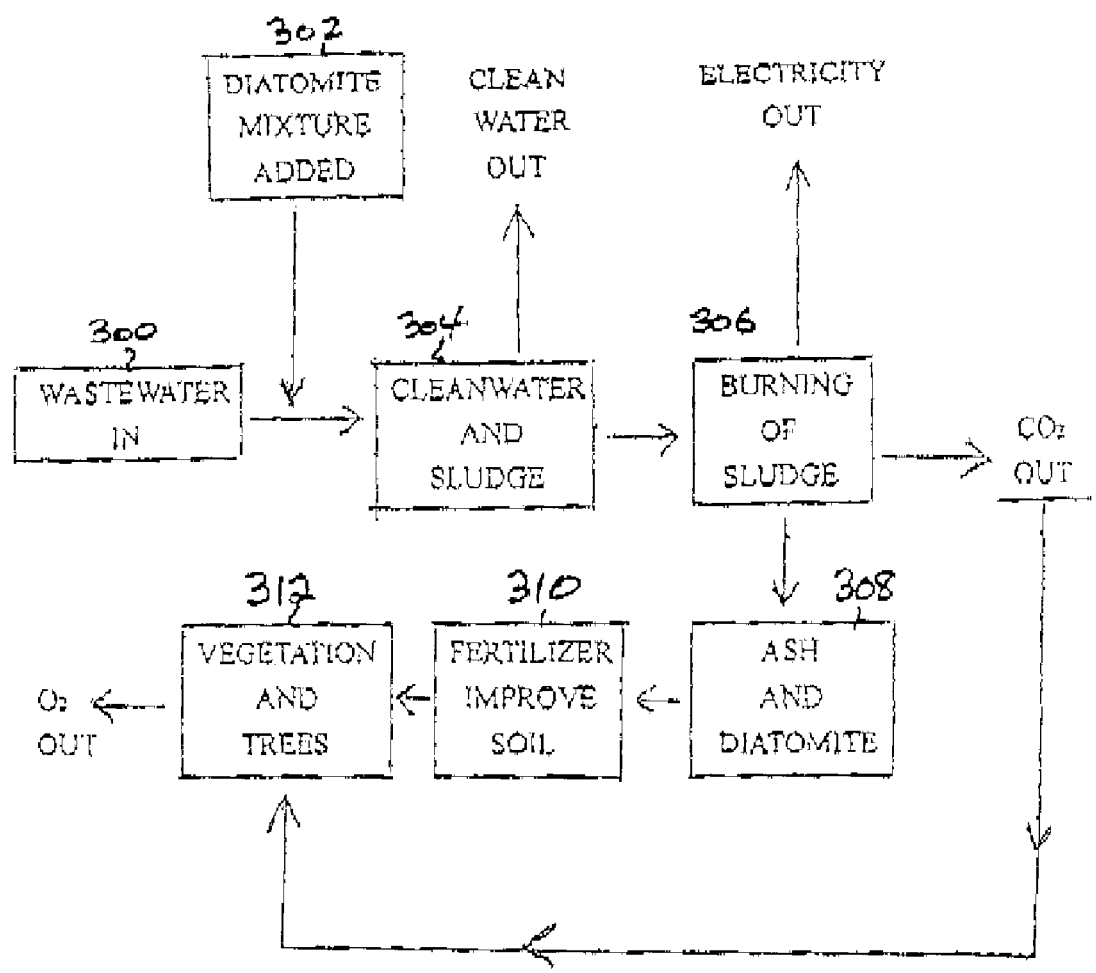
FIG. 5 is a block diagrammatic view of a third embodiment and a preferred embodiment of the present invention showing the combination of apparatus illustrative of the method of the present invention for the treatment of waste water utilizing the novel mixture made according to the illustration of FIG. 1, and the generation of energy and utilization of the output of the waste water treatment so that no resulting waste remains for disposal.

Referring now to FIG. 5, a system is shown that makes use of all possible aspects of the water treatment so that all derived materials are utilized to the fullest. As shown in FIG. 5, the waste water is introduced into the system in block 300. The diatomite mixture as described with reference to FIG. 2 is added from block 302. Clean water and sludge are obtained in block 304 using the system described in conjunction with FIG. 2.

The dried sludge obtained from block 304 may by itself support combustion. If so, then it can be fed into a furnace, such as a furnace with a moving grate, and burned to generate hot gases, which can be used in a known way to produce electricity. If the sludge will not itself independently support full combustion, the sludge can be mixed with a combustion enhancement, such as coal dust, to render it more combustible, and fed to a furnace, such as a furnace with a moving grate. The sludge and coal dust or larger size coal particles are mixed 50% to 70% by volume of sludge and 30% to 50% by volume coal dust or larger sized coal particles. Other known combustion supporting materials can be used instead of or in combination with the coal dust. The mixed sludge and coal dust will constitute a combustible mixture and will support burning. The effluent hot gases are used to generate energy, such as electricity in block 306 in any conventional or known way. The ash emanating from the furnace in block 308 includes the diatomite that was originally added to the waste water in block 302. The ash and diatomite can be used directly as a fertilizer improving material and added to soil in block 310. Alternatively, the diatomite can be separated from the ash and recycled back to the water treatment in block 304. The return of the fertilizer to the soil promotes the growth of vegetation and trees in block 312. The outputs of the system shown in FIG. 5 are clean water usable for any desired purpose; electricity usable as a source of power; $CO_2$ usable to promote the growth of vegetation and trees; and $O_2$ from the vegetation and trees usable by humans and animals for breathing. The present invention provides a novel method that results in a total environmental clean-up and utilization of the products used in and obtained from the treatment of waste water, particularly, municipal waste water.

The invention has been shown, described, and illustrated in substantial detail with reference to the presently preferred embodiments. It will be understood by those skilled in this art that other and further changes and modifications may be made without departing from the spirit and scope of the invention which is defined by the claims appended hereto.

What is claimed is:

1. A composition for use as a flocculant for removing deleterious substances from water, comprising a mixture of treated diatomite of about 50% by volume and a metal chloride of about from 40% by volume to about 60% by volume, the mixture having an enhanced negative electric charge greater than that possessed by diatomite naturally and of a magnitude sufficient to produce movement in human hair when brought close to it, and said enhanced negative electric charge having a duration of at least one year, wherein said composition is made by a method comprising the steps of
   a. heating diatomite in an iron vessel from room temperature to a temperature of from 170° F. to 225° F.,
   b. stirring with an iron paddle during heating to substantially enhance diatomite's natural negative electrical charge,
   c. cooling the heated and stirred diatomite to room temperature, and
   d. mixing the cooled diatomite with a metal chloride selected from the group consisting of ferric chloride, aluminum chloride, and magnesium chloride.

2. A composition according to claim 1 wherein the metallic chloride is aluminum chloride.

3. A composition according to claim 1 wherein the mixture is composed of equal parts by volume of diatomite and metal chloride.

4. A composition according to claim 1 wherein the mixture includes polyacrylamide.

5. A composition according to claim 4 wherein the mixture is composed of equal parts by volume of diatomite and aluminum chloride, and from 1 to 5% of polyacrylamide.

6. A method of making a composition for use as a flocculant for removing deleterious substances from water, comprising the steps of
   a. heating diatomite in an iron vessel from room temperature to a temperature of from 170° F. to 225° F.,
   b. stirring with an iron paddle during heating to substantially enhance diatomite's natural negative electrical charge,
   c. cooling the heated and stirred diatomite to room temperature, and
   d. mixing the cooled diatomite with a metal chloride selected from the group consisting of ferric chloride, aluminum chloride, and magnesium chloride, the proportions of cooled diatomite and metal chloride mixed together comprising from about 50% diatomite by volume and from about 40% to about 60% metal chloride by volume.

7. A method of making a composition according to claim 6 wherein polyacrylamide is added to the mixture.

8. A method of making a composition according to claim 6 wherein the heating is to 180° F. to 200° F.

9. A method of making a composition according to claim 6 wherein the mixture is of equal parts by volume of the diatomite and the metal chloride.

10. A method of making a composition according to claim 9 including adding 1 to 5% of polyacrylamide to the mixture.

* * * * *